United States Patent [19]

Emori et al.

[11] Patent Number: 5,135,068
[45] Date of Patent: Aug. 4, 1992

[54] HYDRAULIC REACTION DEVICE FOR POWER STEERING APPARATUS

[75] Inventors: Yasuyoshi Emori; Yukimitsu Minamibata, both of Saitama, Japan

[73] Assignee: Jidosha Kiki Co., Ltd., Tokyo, Japan

[21] Appl. No.: 789,795

[22] Filed: Nov. 12, 1991

Related U.S. Application Data

[63] Continuation of Ser. No. 577,311, Aug. 31, 1990, abandoned.

[30] Foreign Application Priority Data

Sep. 4, 1989 [JP] Japan .................. 1-229114

[51] Int. Cl.⁵ .............................. B62D 5/06
[52] U.S. Cl. ........................ 180/132; 60/384; 81/375 A; 81/467; 180/142; 180/143; 180/149
[58] Field of Search ............ 180/132, 141, 142, 143, 180/149; 60/384; 91/375 A, 467

[56] References Cited

U.S. PATENT DOCUMENTS

| | | | |
|---|---|---|---|
| 3,744,515 | 7/1973 | Inoue | 180/143 X |
| 4,621,704 | 11/1986 | Kozuka | 180/143 |
| 4,644,846 | 2/1987 | Kozuka | 180/142 X |
| 4,848,500 | 7/1989 | Komine et al. | 180/143 X |
| 4,877,100 | 10/1989 | Emori et al. | 180/143 |

Primary Examiner—Mitchell J. Hill
Attorney, Agent, or Firm—Blakely, Sokoloff, Taylor & Zafman

[57] ABSTRACT

A hydraulic reaction device of a power steering apparatus includes a vehicle-speed responsive pump, a reaction plunger, a hydraulic reaction chamber, a path, and a variable control unit. The vehicle-speed responsive pump has a pressure oil discharge flow rate which changes in accordance with a vehicle speed. The reaction plunger selectively constraining relative pivotal displacement between input and output shafts constituting a rotary flow path switching valve of the power steering apparatus. The hydraulic reaction chamber receives the pressure oil from the pump to apply a reaction oil pressure to the reaction plunger. The path is arranged to connect the hydraulic reaction chamber to a tank. The variable control unit (a variable throttle portion 37 of a reaction oil pressure control valve 11) for variably controlling a flow rate of the pressure oil flowing through the path. The variable control unit is variably controlled in accordance with a magnitude of an oil pressure in a main oil pressure path extending from a main pump to the left and right chambers of the power cylinder.

6 Claims, 9 Drawing Sheets

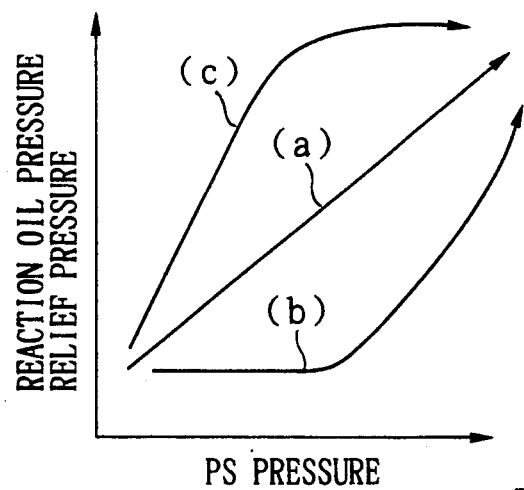
F I G. 12
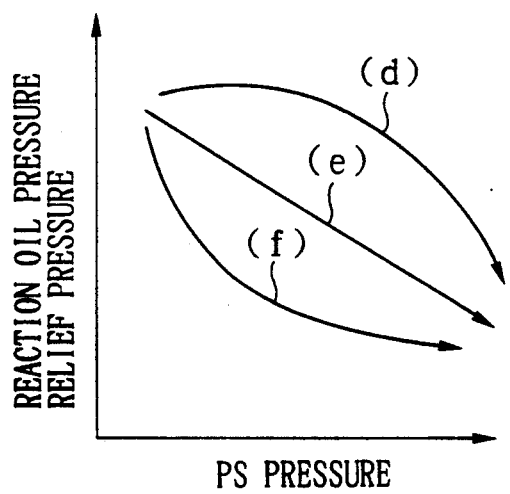
F I G. 13
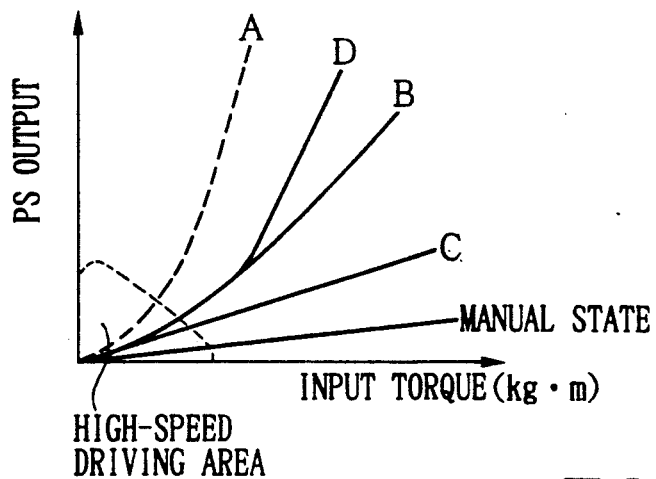
F I G. 14

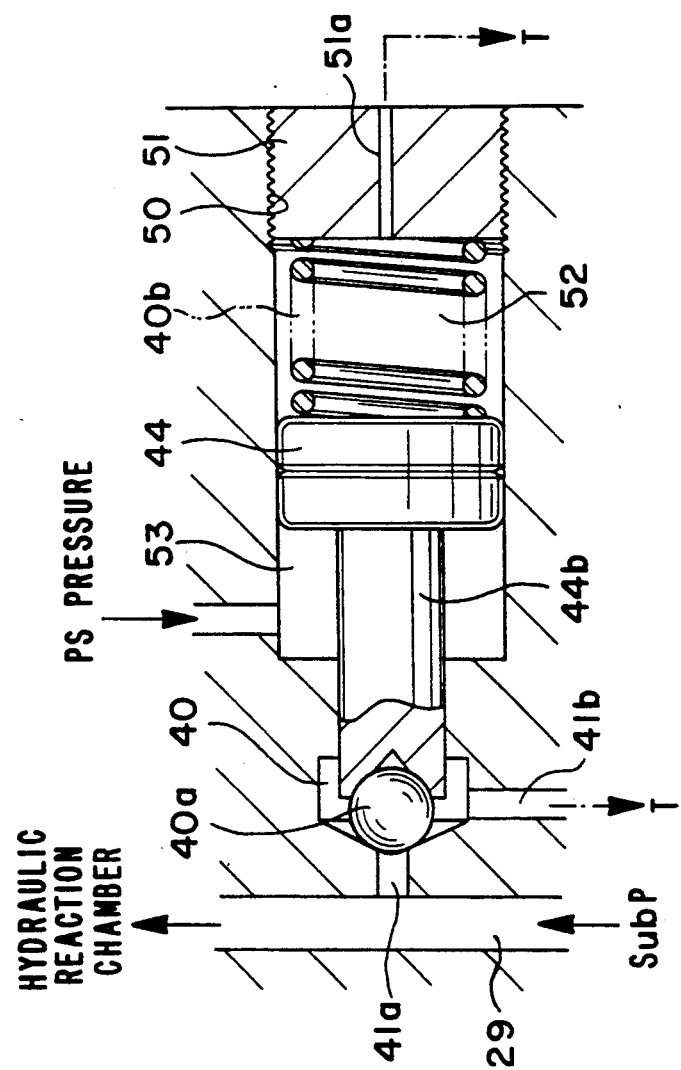

5,135,068

HYDRAULIC REACTION DEVICE FOR POWER STEERING APPARATUS

This is a continuation of application Ser. No. 577,311, filed Aug. 31, 1990, now abandoned.

BACKGROUND OF THE INVENTION

The present invention relates to an improvement in a hydraulic reaction device which can be suitably used in a power steering apparatus to correctly control a steering force in accordance with various vehicle driving conditions such as a vehicle speed.

Various types of hydraulic reaction device of vehicle speed responsive type for performing steering force control corresponding to a running speed of a vehicle (vehicle speed) in a power steering apparatus for reducing a steering operation force (steering force) of an automobile have been proposed. That is, when a vehicle is stopped or runs at a low speed, a reaction oil pressure is minimized to enable light steering operation. When a vehicle runs at a high speed, the reaction oil pressure is increased to realize a heavy steering wheel operation feeling, thereby obtaining stability in straight running. This steering force control is performed by pivoting or constraining input and output shafts of the power steering apparatus relative to each other by a reaction piston for selectively constraining the input and output shafts in accordance with the magnitude of the reaction oil pressure.

As conventional hydraulic reaction devices of this type, Japanese Patent Laid-Open Nos. 61-105273 and 61-132466, Japanese Utility Model Laid-Open No. 62-25265, and Japanese Patent Laid-Open No. 63-68467 propose arrangements in which a reaction oil pressure is divided from a portion of a main oil pressure path connected from a pump to a power cylinder via a flow path switching valve and is controlled by a reaction oil pressure control valve constituted by, e.g., a spool valve so as to be supplied to a hydraulic reaction chamber for moving a reaction piston. In each of these conventional devices, as a driving source of the reaction oil pressure control valve described above, an electric actuator such as a solenoid coil or a stepping motor capable of generating a predetermined operation force by an output current from a controller in accordance with a detection signal from a vehicle speed sensor, a steering angle sensor, or a torque sensor is generally used. The hydraulic reaction device is correctly and reliably operated by such electronic control to perform steering force control corresponding to a vehicle speed or steering conditions.

According to the above conventional devices, however, the reaction oil pressure control valve is required to control the reaction oil pressure supplied to the hydraulic reaction chamber in accordance with vehicle speed or the like, and the actuator such as a solenoid coil driven by a controller using a microcomputer or the like having a converter for converting a current output in accordance with a detection signal from, e.g., a vehicle speed sensor is required as a driving source for driving the control valve. As a result, the number of components is increased to complicate the structure of the device, thereby increasing a manufacturing cost. In addition, in the above controller, a countermeasure against a disturbance such as an electromagnetic wave interference is essential to perform stable control. As a result, the manufacturing cost is further increased.

For this reason, Japanese Utility Model Publication No. 61-32851 proposes a simple hydraulic reaction device in which a vehicle-speed responsive pump capable of increasing/decreasing its discharge flow rate in accordance with an increase/decrease in vehicle speed is used independently of a main pump as a reaction oil pressure source. This device has a great advantage of a simpler arrangement than those of the above conventional devices. In such a simple device, however, since the vehicle-speed responsive pump cannot be directly connected to the hydraulic reaction chamber, an oil pressure-controlled spool valve having a spool operated in accordance with the discharge flow rate from the pump to control the reaction oil pressure to the hydraulic reaction chamber in a predetermined state must be used as a pressure control valve. In particular, the above pressure control valve increases the discharge flow rate from the pump in accordance with a vehicle speed to drive the spool by using a pressure difference produced between the upstream and downstream sides of variable and fixed throttle portions arranged in a path of the spool and supplies the reaction oil pressure to the hydraulic reaction chamber through a reaction path extending from the upstream side of the two throttle portions. Therefore, the structure and control of the valve are complicated to increase manufacturing cost.

In addition, even if the above pressure control valve is used, since a subpump hydraulic system constituted by the vehicle-speed responsive pump is arranged to control a reaction oil pressure independently of a main pump hydraulic system of the power steering apparatus, the pressure control valve responds to only a vehicle speed but is not related to other various driving conditions of a vehicle, e.g., a steering state such as an input torque to a steering wheel or an operation in the main pump hydraulic system such as external conditions, e.g., kick-back from a road. Therefore, steering reaction control in which steering force control can be performed by a power cylinder output in correspondence with various driving conditions cannot be expected. For example, a force required to operate a steering wheel is desired to be increased in proportion to an increase in vehicle speed and an increase in power cylinder output, i.e., steering resistance. However, the subpump hydraulic system which can obtain only a reaction oil pressure controlled simply by a vehicle speed cannot satisfy these requirements. Therefore, a demand has arisen for a certain countermeasure capable of solving the above problems.

In particular, in a hydraulic reaction device of this type, an arrangement must be simplified to reduce manufacturing cost, and the reaction oil pressure must be proportionally controlled to have a magnitude or characteristics satisfactory to produce a steering reaction force capable of obtaining a required steering force in accordance with a vehicle speed or driving conditions, thereby obtaining a correct and reliable steering reaction force to perform steering force control. Therefore, these requirements must be taken into consideration.

SUMMARY OF THE INVENTION

It is, therefore, an object of the present invention to provide a hydraulic reaction device of a power steering apparatus, which can perform steering force control more correctly and reliably than conventional devices.

It is another object of the present invention to provide a hydraulic reaction device of a power steering apparatus, which improves a steering feeling to be better that those obtained by conventional devices.

It is still another object of the present invention to provide a hydraulic reaction device of a power steering apparatus, which can correctly perform a steering operation by a steering force corresponding to changes in a vehicle speed or steering conditions.

It is still another object of the present invention to provide a hydraulic reaction control valve of a power steering apparatus, which can realize the above objects by using a reaction oil pressure control means (e.g., a variable throttle portion 37 of a reaction oil pressure control valve 11 shown in FIG. 2) having a simple arrangement.

In order to achieve the above objects of the present invention, there is provided a hydraulic reaction device for a power steering apparatus for supplying a pressure oil to left and right chambers of a power cylinder via a control valve for switching a flow path from a main pipe in accordance with a steering operation, thereby producing a predetermined auxiliary steering force, comprising a vehicle-speed responsive pump having a pressure oil discharge flow rate which changes in accordance with a vehicle speed, a reaction plunger for selectively constraining relative pivotal displacement between input and output shafts constituting a rotary flow path switching valve of the power steering apparatus, a hydraulic reaction chamber for receiving the pressure oil from the pump to apply a reaction oil pressure to the reaction plunger, a path arranged to connect the hydraulic reaction chamber to a tank, and variable control means (a variable throttle portion 37 of a reaction oil pressure control valve 11) for variably controlling a flow amount of the pressure oil flowing through the path, wherein the variable control means is variably controlled in accordance with a magnitude of an oil pressure in a main oil pressure path extending from a main pump to the left and right chambers of the power cylinder.

According to the present invention, the reaction oil pressure from the vehicle-speed responsive pump as a reaction oil pressure source is supplied to the hydraulic reaction chamber by the subpump hydraulic system, and the reaction oil pressure in the hydraulic reaction chamber is correctly and reliably controlled in accordance with various vehicle driving conditions such as a vehicle speed and a steering state by variably controlling the flow rate of the pressure oil in the path connecting the hydraulic reaction chamber to the tank in accordance with the magnitude of the oil pressure to be supplied from the main oil pressure path to the left and right chambers of the power cylinder, which varies in accordance with a steering operation or the like in the main pump hydraulic system, thereby obtaining a steering force corresponding to an operation state of the main pump hydraulic system in the power steering apparatus. As a result, an auxiliary steering force corresponding to changes in a vehicle speed or steering conditions can be obtained to perform a steering operation by a correct steering force.

BRIEF DESCRIPTION OF THE DRAWINGS

FIGS. 12 to 14 are graphs showing positive and negative reaction oil pressure relief pressure-PS pressure characteristics and PS output characteristics with respect to an input torque, respectively; and FIG. 15 is a sectional view showing in detail a relief valve according to a modification of the present invention.

DETAILED DESCRIPTION OF THE PREFERRED EMBODIMENTS

Figure 1:
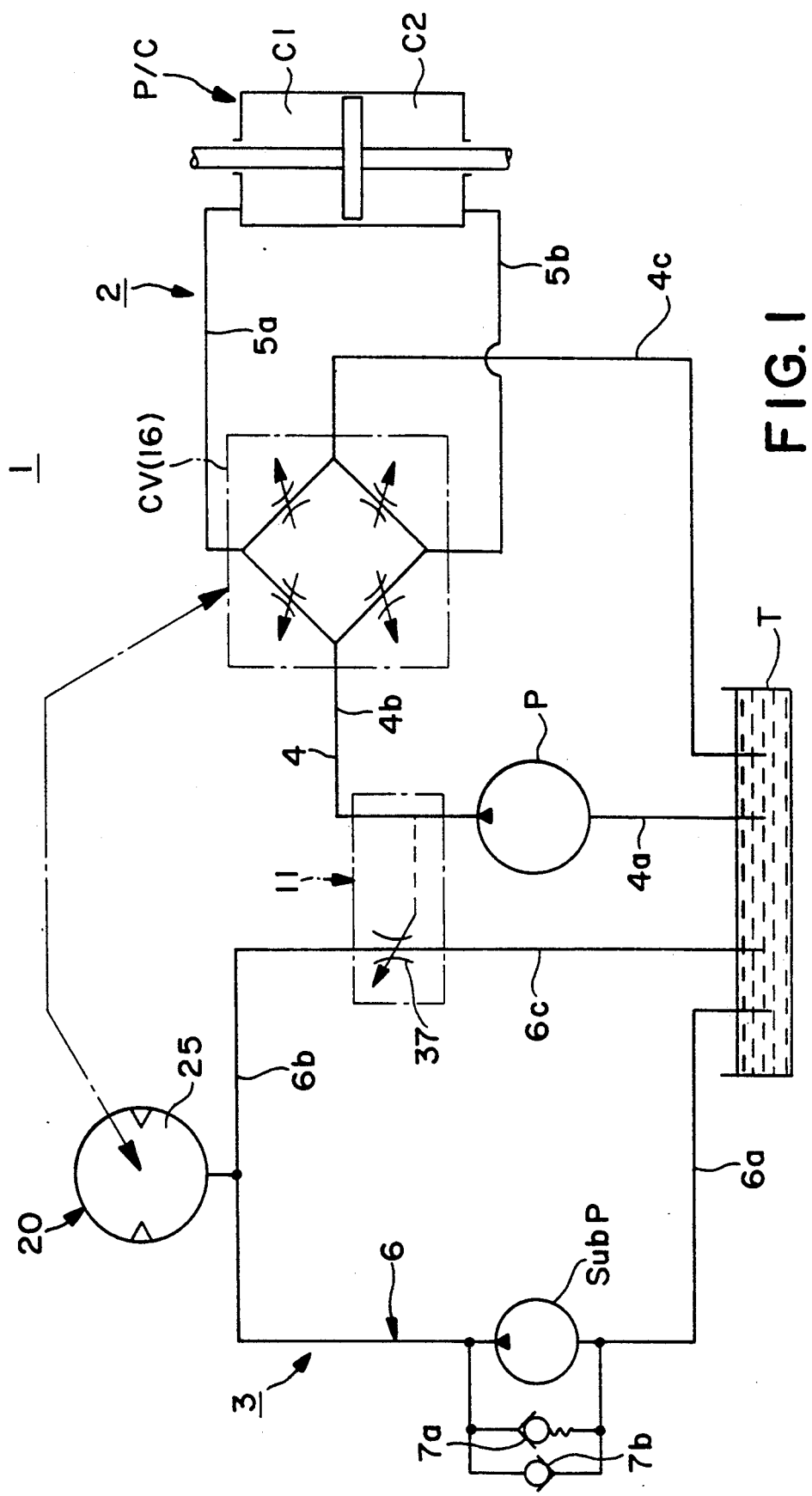
FIG. 1 is a circuit diagram showing an embodiment of a hydraulic reaction device of a power steering apparatus according to the present invention.

FIGS. 1 to 5 show an embodiment of a hydraulic reaction device of a power steering apparatus according to the present invention. First, a hydraulic circuit of a power steering apparatus 1 will be briefly described below with reference to FIG. 1. This hydraulic circuit comprises a main pump hydraulic system 2 for supplying a pressure oil from a main pump P to a power cylinder (represented by P/C) serving as an apparatus actuator and returning it to a tank T via a flow path switching valve or servo valve CV, and a subpump hydraulic system 3 for supplying a pressure oil from subpump subP as a vehicle-speed responsive pump to a hydraulic reaction device 20 (a hydraulic reaction chamber 25 to be described later) and returning it to the tank T via a reaction oil pressure control means (a reaction oil pressure control valve 11 to be described later) which characterizes the present invention. Reference numeral 4 denotes an oil path constituting the main pump hydraulic system 2. The oil path 4 comprises a path 4a for connecting the tank T and the main pump P, a main oil pressure path 4b for supplying a pressure oil discharged from the main pump P to a flow path switching valve CV which selectively performs oil pressure control with respect to left and right chambers C1 and C2 of the power cylinder P/C by using paths 5a and 5b in accordance with a steering direction or a steering angle obtained by a steering operation, and a return path 4c for returning the oil from the flow path switching valve CV to the tank T. A detailed arrangement or operation state of the oil path 4 is well known to those skilled in the art.

Reference numeral 6 denotes an oil path of the subpump hydraulic system 3 which is arranged independently of the above main pump hydraulic system 2 and constitutes the hydraulic reaction device 20 to be described later. The subpump subP as a vehicle-speed responsive pump capable of changing a discharge flow rate in accordance with a vehicle speed is provided midway along a path 6a from the tank T, and an oil pressure from the subpump subP is supplied to the hydraulic reaction device 20 and returned to the tank T through paths 6b and 6c. The reaction oil pressure control means (a variable throttle portion 37 of the reaction oil pressure valve 11 to be described later) which characterizes the present invention is provided midway along the paths 6b and 6c at a portion on the downstream side of the subpump subP from a connecting portion with respect to the hydraulic oil pressure device 20 (the hydraulic reaction chamber 25 to be described later) to the tank T. This control means causes a fluid pressure on its upstream side to serve as a reaction oil pressure in the hydraulic reaction chamber 25 of the hydraulic reaction device. Note that reference numerals 7a and 7b denote a relief valve and a check valve for a flow from the subpump subP which is flowed in forward and reverse directions upon forward and backward movements of the vehicle. As the vehicle-speed responsive pump subP, a compact automatic transmission pump driven by a transmission output shaft and having a discharge flow rate which is changed in accordance with a vehicle speed or a compact pump mounted on an extraction port of a speedometer cable can be used.

Referring to FIG. 1, the main pump hydraulic system 2 and the subpump hydraulic system 3 constituting the hydraulic circuit in the power steering apparatus 1 are arranged independently of each other. However, the return paths 4c and 6c of the oil paths 4 and 6 can be merged into a single path.

Figure 2:
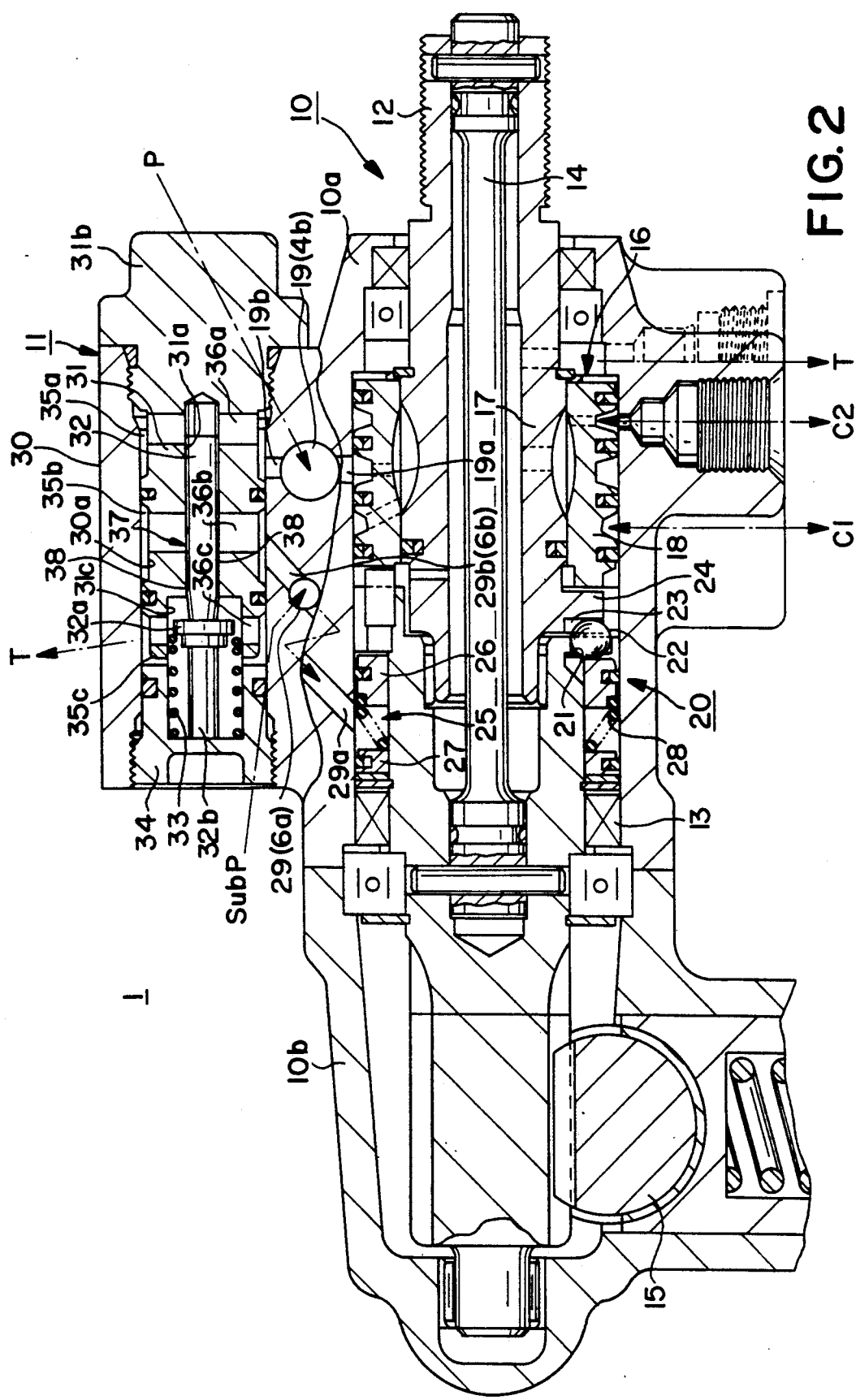
FIG. 2 is a longitudinal side sectional view showing a schematic arrangement of the overall power steering apparatus according to the present invention.

In addition, the power steering main body 10 has a known arrangement as schematically shown in FIG. 2, and the reaction oil pressure control valve 11 (to be described later) serving as the reaction oil pressure control means which characterizes the present invention is integrally formed at one side of the power steering main body 10. More specifically, reference numeral 12 denotes an input shaft (stub shaft) to be coupled to a steering wheel (not shown); and 13, an output shaft (pinion shaft) to be coupled to the left end side of the input shaft 12 via a torsion bar 14 and having a pinion to be meshed with a rack 15 which constitutes a steering linking mechanism (not shown). The two shafts 12 and 13 are pivoted in their steering directions. A fail-safe mechanism is provided between the two shafts 12 and 13 and pivoted through a predetermined angle or more so as to be in contact with and couple the two shafts.

In steering bodies 10a and 10b constituting the power steering main body 10, a rotor 17 and a sleeve 18 constituting a rotary flow path switching valve 16 in the main pump hydraulic system 2 described above are disposed integrally with the two shafts 12 and 13. Flow path switching between the main pump P, the tank T, and the left and right chambers (C1 and C2) of the power cylinder P/C is performed by relative rotational displacement of the rotor 17 and the sleeve 18. An arrangement, an operation, and the like of the rotary flow path switching valve 16 are conventionally known to those skilled in the art and a detailed description thereof will be omitted. Reference numeral 19 denotes a path hole formed in a portion of the body 10a and constituting a portion of the main oil pressure path 4b for supplying a pressure oil from the main pump P to a pump port of the flow path switching valve 16 via a connecting hole 19a.

Reference numeral 20 denotes a hydraulic reaction device provided between the input and output shafts 12 and 13 formed integrally with the rotor 17 and sleeve 18 and constituting the subpump hydraulic system for performing steering force control by using a hydraulic reaction force. The hydraulic reaction device 20 comprises a plurality of guide holes 21 formed along the axial direction through a flange portion of the output shaft 13, a plurality of balls 22 slidably held in only the axial direction in the guide holes 21, a reaction force receiving portion 24 formed on the input shaft 12 to oppose one side surface of the flange portion and having an engaging recess portions 23 provided in the same number as that of the balls 22 and having inclined surfaces as two sides along the rotation direction to be engaged with the balls 22, a hydraulic reaction chamber 25 formed at the other side surface of the flange portion, and a ring-like reaction plunger 26, slidably held in the hydraulic reaction chamber 25 so as to be coaxial with the input and output shafts 12 and 13, for urging the balls 22 against the engaging recess portions 23 of the reaction force receiving portion 24 to apply a constraining force corresponding to the reaction oil pressure between the input and output shafts 12 and 13. Reference numeral 27 denotes a sealing member, fitted on the outer circumferential surface of the output shaft 13 with a slight oil-tight clearance, for sealing the other end of the hydraulic reaction chamber 25; 28, a set spring for applying a predetermined set pressure to a reaction plunger 26 arranged in the hydraulic reaction chamber 25; and 29, a path hole formed in a portion of the body 10a and constituting the path 6a serving as a reaction oil pressure supply path for supplying a reaction oil pressure from the vehicle-speed responsive subpump subP to the hydraulic reaction chamber 25 through a connecting path hole 29a.

In the above arrangement, when the balls 22 held in the guide holes 21 at the output shaft 13 side are pressed by the right end portion of the reaction plunger 26 urged to the right in the axial direction by a reaction oil pressure which is arbitrarily supplied to the hydraulic reaction chamber 25 in accordance with various vehicle driving conditions such as a vehicle speed, the balls 22 are urged in the axial direction so as to be engaged with the engaging recess portion 23 of the reaction force receiving portion 24 at the input shaft 12 side. As a result, a predetermined neutral position constraining force is obtained by the hydraulic reaction force to arbitrarily constrain a relative rotation state between the input and output shafts 12 and 13, and a required steering force is obtained to correctly perform a steering force control. That is, when the input shaft 12 is rotated upon steering, the balls 22 run on one inclined surface of the engaging recess portion 23 and move in the axial direction by an inclined amount to urge the reaction plunger 26, thereby producing a reaction force. This reaction force is transmitted as a steering reaction force to the input shaft 12.

Note that the hydraulic reaction device 20 and the power steering apparatus 1 as described above are not limited to those having the above structures of the present invention but may be various types of known hydraulic reaction devices or power steering apparatuses.

According to the present invention, in the power steering apparatus 1 having the power steering main body 10 and the hydraulic reaction chamber 20, as is apparent from FIGS. 1 and 2, the vehicle-speed responsive pump subP having a discharge flow rate which changes in accordance with a vehicle speed is used, and a flow rate of a pressure oil flowing through the paths 6b and 6c for connecting, to the tank T, the reaction hydraulic chamber 25 for causing a reaction oil pressure to act on the reaction plunger 26 for urging the balls 22 which selectively restrict the relative rotational displacement between the input and output shafts 12 and 13 constituting the flow path switching valve 16 (CV) at the main pump hydraulic system 2 when the pressure oil is supplied from the sub pump subP is variably controlled by using a reaction oil pressure control means (e.g., the reaction oil pressure control valve 11 shown in FIG. 2) such as a variable throttle mechanism to be activated in accordance with the magnitude of the oil pressure in the main oil pressure path 4b extending from the main pump P to the power cylinder left and right chambers C1 and C2 in the power steering apparatus 1, thereby variably controlling the pressure of the reaction oil pressure to be supplied to the hydraulic reaction chamber 25.

With the above arrangement, in the subpump hydraulic system 3, the reaction oil pressure from the vehicle-speed responsive pump subP as a reaction oil pressure source is supplied to the hydraulic reaction chamber 25, and the flow rate of the pressure oil in the paths 6b and 6c for connecting the hydraulic reaction chamber 25 to the tank T is variably controlled in accordance with the magnitude of the oil pressure which is supplied to the power cylinders C1 and C2 in the main oil pressure path 2 and varies in accordance with a steering operation or the like in the main pump hydraulic system, thereby correctly and reliably, variably controlling the flow rate in accordance with various vehicle running conditions, e.g., a vehicle speed and a steering state such as a steering force or a running state upon steering. As a result, a steering reaction force related to the operation in the main pump hydraulic system 2 of the power steering apparatus 1 can be obtained. Therefore, an auxiliary steering force corresponding to a change in vehicle speed or steering state can be obtained to perform a steering operation by a correct steering force.

The reaction oil pressure control valve 11 used as a hydraulic reaction control means in this embodiment of the present invention to perform the above reaction oil pressure control will be described in detail below with reference to FIGS. 2 to 5. This reaction oil pressure portion 30a in a body 30 formed integrally with a steering control valve 11 comprises a sleeve 31 fitted in a hole body 10a, a spool 32 slidably arranged in a shaft hole 21a of the sleeve 31, and a return spring 33 for biasing the spool 32 in one direction (to the right in FIG. 2). Reference numeral 31b denotes a head portion of the sleeve 31 to be threadably engaged to close the right end portion of a hole portion 30a formed through the body 30; and 34, a plug for closing the left end of the hole portion 30a and adjusting a set load on the return spring 33. The return spring 33 is inserted between the inner end of the plug 34 and the flange portion 32a at the left end portion of the spool 32 arranged inside a large-diameter hole 31c formed in the left end portion of the sleeve 31, thereby constantly applying a biasing force to the spool 32 to the right in FIG. 2. Reference numeral 32b denotes a stopper, projecting in the axial direction from the left end portion of the spool 32, for regulating a moving amount of the spool 32 to the left in FIG. 2. The stopper 32b has a functional feature whereby the displacement of the spool is limited so that the minimum opening area of the variable throttle is kept constant at a pressure larger than the predetermined value. With use of such stopper, the reaction oil pressure can be kept at a constant value without being increased with increases of the main pump pressure. Therefore, a characteristic can be obtained nearly equal to that of the curve D in FIG. 14. The crossing point (junction point) of curves B and D is the place where the stopper is in contact with the surface of the large-diameter hole 31c of sleeve 31. A characteristic curve nearly equal to the curve D is obtained by shifting an equal distance to the increasing direction of the input torque from the points on the curve D corresponding to the increase of PS pressure. The above characteristic curve nearly equal to the curve D shows the possibility of controlling the reaction oil pressure in an economical manner without a relief valve.

Three annular grooves 35a, 35b, and 35c are formed on the outer circumferential portion of the sleeve 31 from the right side in FIG. 2, and path holes 36a, 36b, and 36c are formed in the centripetal direction of the sleeve 31 from the annular grooves 35a, 35b, and 35c into the valve hole 31a and the large-diameter hole 31c. The annular groove 35a at the right end of the sleeve 31 is connected to the path hole 19 from the main pump P through the connecting hole 19b to supply the pressure oil in the main oil pressure path 4b from the main pump P to the right end of the spool 32, and the spool 32 moves to the left against the returning spring 33 in accordance with the magnitude of the oil pressure. The annular groove 35c at the left end of the sleeve 31, the path hole 36c, and the large-diameter hole 31c having the spring 33 therein are connected to the tank T through a reflux path (corresponding to the return path 6c shown in FIG. 1). The annular groove 35b at the center in the axial direction of the sleeve 31 is connected to a path hole 29 for flowing the reaction oil pressure from the vehicle-speed responsive subpump subP for supplying the reaction oil pressure to the hydraulic reaction chamber 25 through a connecting hole 29b so that the reaction oil pressure is supplied to the shaft hole 31a of the sleeve 31 for holding the spool 32 through a path hole 36b.

Figure 5:
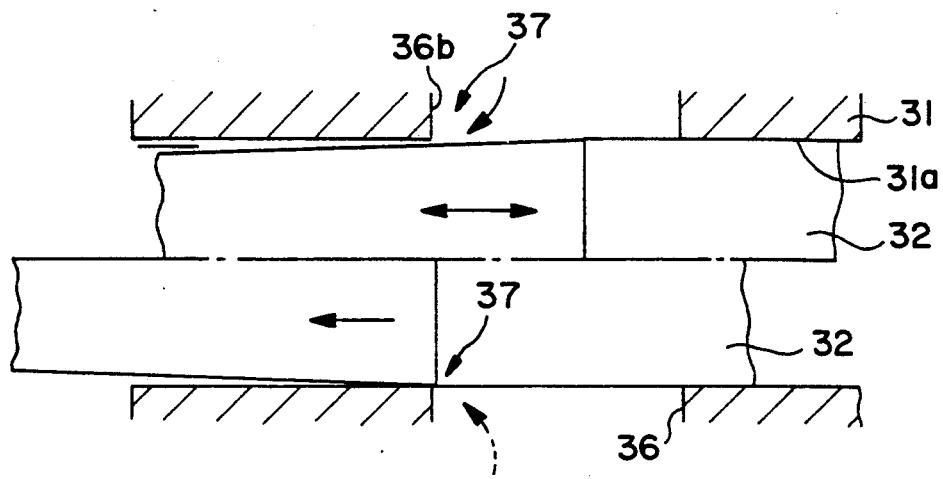
FIG. 5 is a view showing in detail a variable throttle portion as a main part of the reaction oil pressure control valve shown in FIGS. 3 and 4.

As is apparent from FIG. 5, a variable throttle portion 37 for opening/closing the reflux path for returning the reaction oil pressure from the subpump subP to the tank T is formed on the outer circumferential portion of the spool 32 at a portion corresponding to the path hole 36b to which the reaction oil pressure from the subpump subP is supplied and the large-diameter hole 31c communicating with the tank T. This variable throttle portion 37 is constituted by the path hole 36b open to the sleeve shaft hole 31a and a tapered surface 38 formed on the outer circumferential portion of the spool 32. An opening amount of the reflux path is variably controlled in accordance with a positional relationship between the tapered surface 38 and the path hole 36b. This tapered surface 38 need only be formed to have a largest opening amount in a non-steering state shown in FIG. 3 and to close the reflux path when the spool 32 moves to the left upon steering operation shown in FIG. 4. Therefore, the shape of the tapered surface 38 may be variously modified to be a chamfer formed on a portion of the outer circumferential portion of the spool 32 or a truncated cone formed on the entire circumference thereof.

In this arrangement, when an engine is stopped, and the vehicle is stopped, the main pump P or the subpump subP is in a non-operation state, and the power steering apparatus 1 and the hydraulic reaction device 20 are in an inoperable state. In this case, in the reaction oil pressure control valve 11, the spool 32 is kept at the rightmost position in the sleeve 31 by the spring 33, and the flange portion 32a at the left end of the spool 32 is in contact with the bottom portion of the sleeve large-diameter hole 31c.

Figure 3:
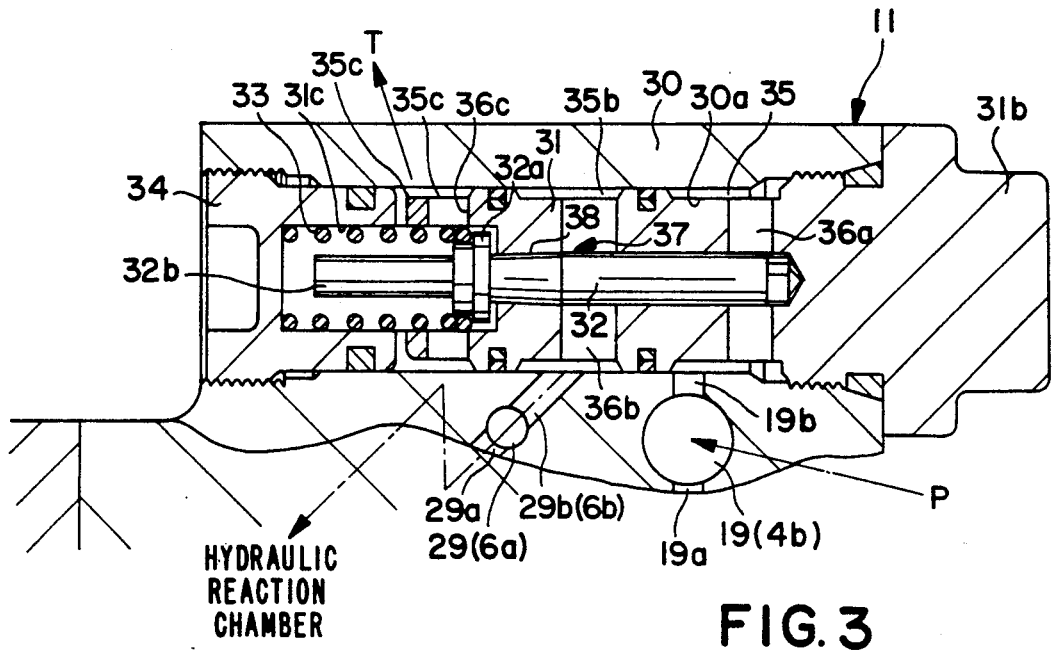
FIGS. 3 and 4 are views for explaining an operation of a reaction oil pressure control valve as a reaction oil pressure control means which characterizes the present invention.
Figure 4:
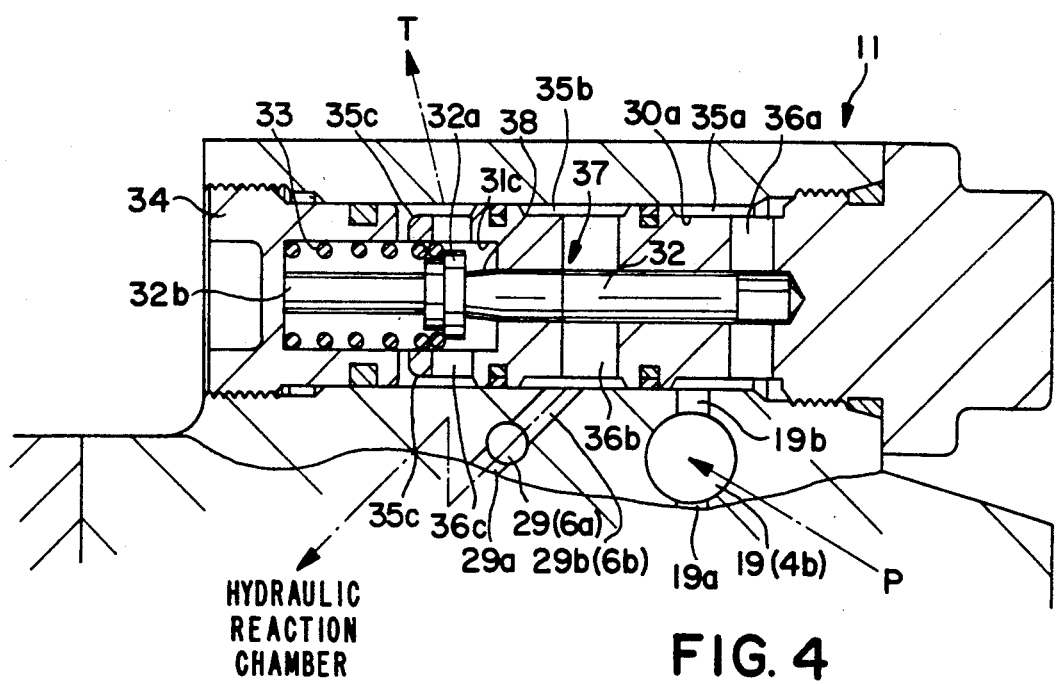

When a vehicle is stopped or runs at a low speed while the engine is started and the main pump P is driven, if a steering wheel is not operated, under operation of the pressure oil flowing from the main pump P to the main oil pressure path 4b, a pressure caused thereby is supplied to the right end of the spool 32 through the path hole 19 and the connecting hole 19b to slightly move the spool 32 to the left in accordance with the magnitude of the oil pressure, as shown in FIG. 3. However, an opening amount of the reflux path in the subpump hydraulic system 3 for supplying a reaction oil pressure is ensured. When a steering operation is performed in this state, the oil pressure in the main oil pressure path 4b (19) from the main pump P is increased. Therefore, the spool 32 moves to the left to close the reflux path in the subpump hydraulic system 3 by the throttle mechanism 37, thereby supplying the reaction oil pressure from the vehicle-speed responsive subpump subP to the hydraulic reaction chamber 25. At this time, however, since the vehicle speed is zero or low, the reaction oil pressure supplied to the hydraulic reaction chamber 25 in the subpump hydraulic system 3 is small. As a result, since the hydraulic reaction force in the hydraulic reaction device 20 is small, a steering reaction force to the steering wheel side is small, and a light steering operation is realized by an auxiliary steering force in the power steering apparatus 1. This auxiliary steering force increased in accordance with a steering angle. Therefore, it is apparent that a correct steering operation corresponding to a steering angle can be performed.

When a vehicle speed is increased, the flow rate of the pressure oil from the vehicle-speed responsive subpump subP is increased. When a steering wheel is operated as described above, therefore, the throttle amount of the reflux path is reduced by the left movement of the spool 32 to increase the reaction oil pressure to the hydraulic reaction chamber 25. As a result, a steering reaction force to the steering wheel is increased upon high speed driving to realize a heavy and stable steering wheel operation.

Referring to FIG. 5, the upper half portion indicates a state in which the spool 32 moves to the right to open the throttle mechanism 37, and the lower half portion indicates a state in which the spool 32 moves to the left to close the throttle portion 37.

Figure 6A:
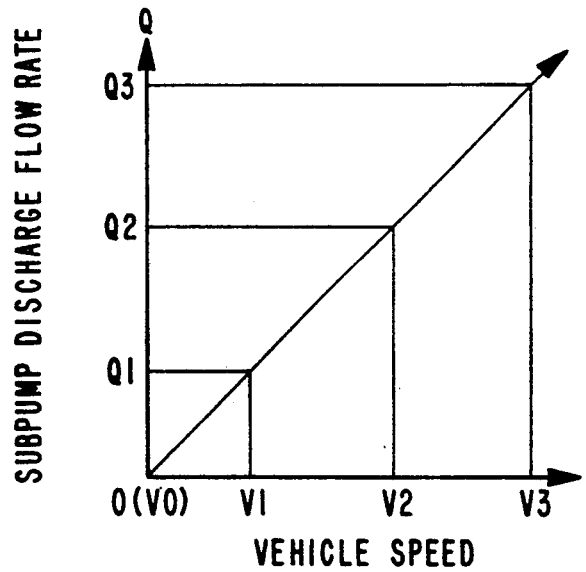
FIGS. 6A and 6B are graphs showing discharge flow rate characteristics of a vehicle-speed responsive pump and opening area characteristics of the variable throttle portion according to a PS pressure.
Figure 6B:
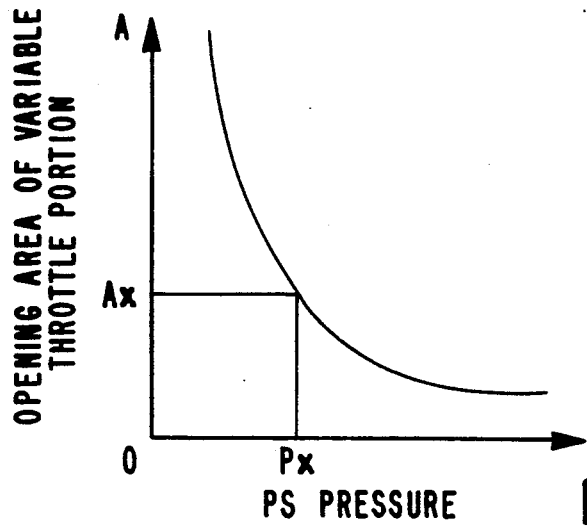
Figure 7A:
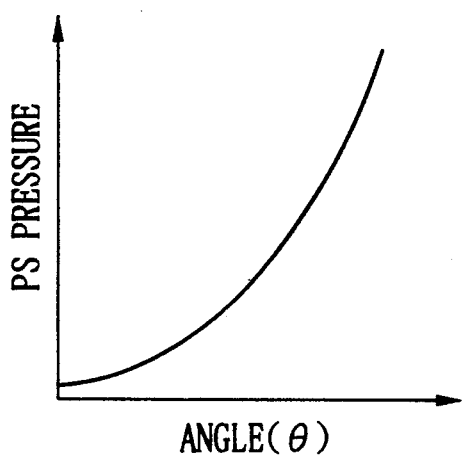
FIGS. 7A and 7B and FIGS. 8A and 8B are graphs showing steering angle-PS pressure characteristics and reaction pressure characteristics of the device according to the present invention and a conventional device, respectively.
Figure 8A:
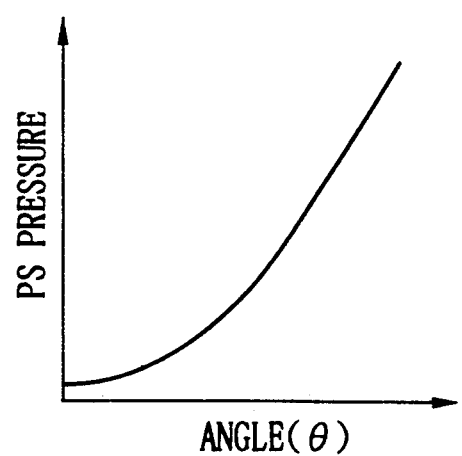
Figure 7B:
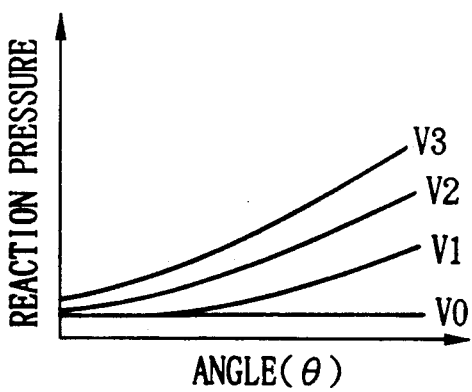
Figure 8B:
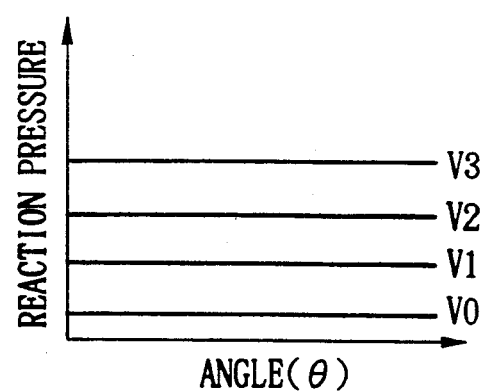

That is, according to the present invention, in the subpump hydraulic system 3 connected t the hydraulic reaction chamber 25 for supplying a pressure oil from the vehicle-responsive subpump subP as a reaction oil pressure by a discharge flow rate corresponding to a vehicle speed as shown in FIG. 6A, an opening area of the variable throttle portion 37 at the reaction oil pressure control valve 11 provided in the reflux path connected to the tank T and having a spool valve structure is variablly controlled, as shown in FIG. 6B, by the spool 32 operated in accordance with the magnitude of the oil pressure (a PS pressure at the entrance of the cylinder) in the main oil pressure path 2 in a steering system, which varies from low to high pressures in accordance with a steering state upon left and right steering operations. In this arrangement, when the pressure oil is to be supplied from the vehicle-speed responsive pump subP as a reaction oil pressure generating source to the hydraulic pressure chamber 25, a flow rate of the pressure oil can be increased/decreased in synchronism with a steering state at the main pump hydraulic system 2 side of the power steering apparatus 1. Therefore, the reaction oil pressure in the hydraulic reaction chamber 25 can be correctly and reliably controlled in accordance with various vehicle running conditions such as a vehicle speed and a steering state, thereby obtaining a predetermined steering reaction force corresponding to the operation state of the main pump hydraulic system 2 in the power steering apparatus 1. As a result, steering operation can be obtained by a steering force corresponding to a change in vehicle speed or steering state.

Figure 9A:
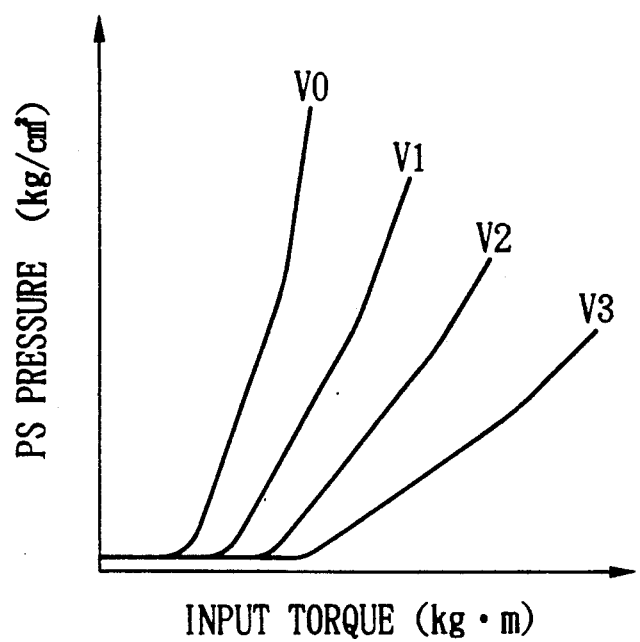
FIGS. 9A and 9B are graphs showing input torque-PS pressure characteristics of the device according to the present invention and the conventional device, respectively.
Figure 9B:
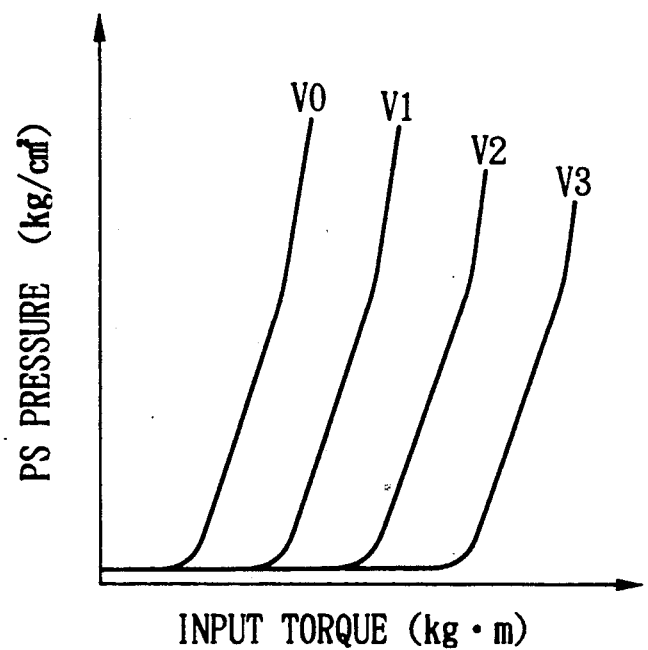

In other words, in a conventional device in which a pressure oil from the subpump subP having a discharge flow rate which changes in accordance with a vehicle speed is simply supplied to the reaction chamber 25 via a pressure control valve, although a steering angle (displacement angle)-PS pressure characteristic obtained by the flow path switching valve 16 is the same as that of the device of the present invention, a steering angle-reaction pressure characteristic of the conventional device is different from that of the device of the present invention, as is apparent from comparisons between FIGS. 7A and 7B FIGS. 8A and 8B. That is, in the conventional device, the pressure oil having a predetermined pressure according to a vehicle speed constantly acts regardless of a change in steering angle. In the device of the present invention, however, the reaction pressure is low when the steering angle is small, and different characteristic curves can be obtained in accordance with changes in vehicle speed. This is because an opening area is changed by the variable throttle portion 37. An input torque-PS pressure characteristic as shown in FIG. 9A is obtained by this reaction pressure characteristic of the variable throttle portion 37. Therefore, a rise characteristic which gradually changes to have a moderate inclination as the vehicle speed is increased can be obtained. This characteristic is apparently more advantageous than a characteristic of the conventional device in which a characteristic curve having the same rise inclination is simply shifted in accordance with a vehicle speed as shown in FIG. 9B.

Figure 10:
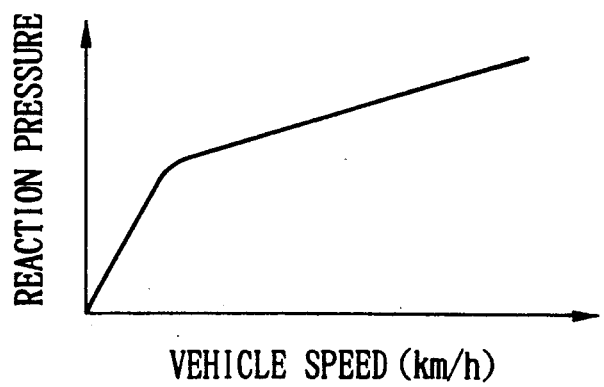
FIG. 10 is a graph showing vehicle speed-reaction pressure characteristics.

According to the present invention described above, since the reaction pressure can be gradually increased in accordance with displacement of the flow path switching valve 16 constituting the main pump hydraulic system 2 in the power steering apparatus 1, the reaction pressure can be reduced in a non-steering state in which a steering wheel is not operated. Therefore, as compared with the conventional device in which a predetermined reaction pressure constantly acts regardless of a steering state, a sliding resistance of a sealing member in the hydraulic reaction chamber 25 can be reduced to improve a steering feeling. Note that FIGS. 7A to 9B, reference symbols V0, V1, V2, and V3 denote vehicle speeds which range from low to high speeds. FIG. 10 is a graph showing a relationship between the vehicle speed and the reaction pressure. The effect of the present invention is apparent from the relationship shown in FIG. 10.

In addition, the device of the present invention does not use a pressure control valve having a problem in steering force control characteristics unlike in a conventional device, and the device is not an electronic-controlled type which requires expensive parts such as a control valve for reaction oil pressure control or an electric actuator, a controller, and a sensor for driving the valve. Therefore, an arrangement of the device can be simplified to decrease the size of the device as a whole, and manufacturing cost can be reduced. Furthermore, the device does not use parts such as a vehicle-speed sensor or a controller which is easily influenced by a disturbance such as an electromagnetic wave interference. Therefore, reaction oil pressure control can be performed with high reliability.

Figure 11:
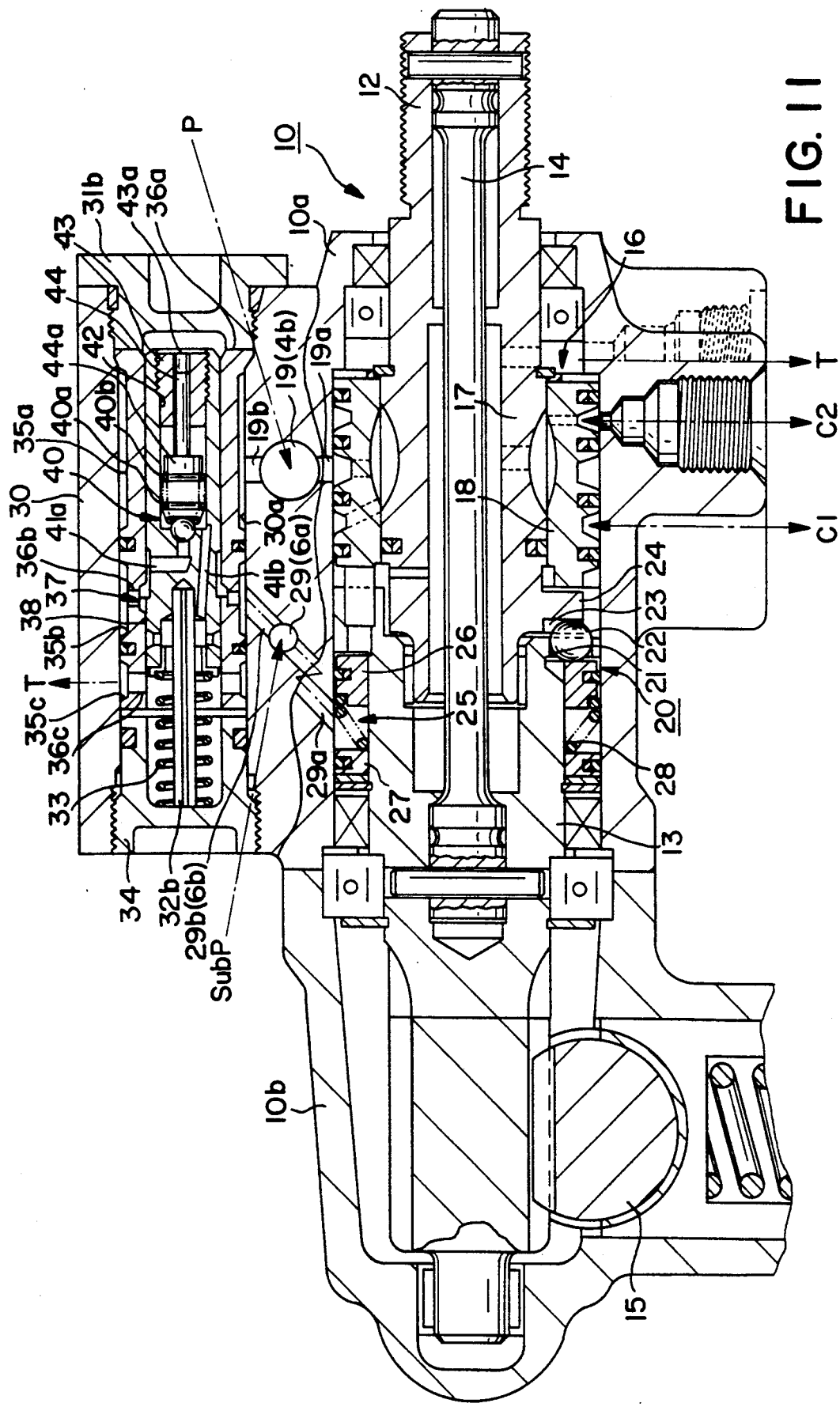
FIG. 11 is a schematic sectional view showing an overall device according to another embodiment of the present invention.

FIG. 11 shows another embodiment of the present invention. In this embodiment, the shape and structure of a spool 32 of a control valve 11 as a reaction oil pressure flow rate control means are changed, and a relief valve 40 for a reaction oil pressure is provided in the spool 32. In addition, similar to the reaction oil pressure control described above, a set pressure of the relief valve 40 can be variably controlled by the magnitude of an oil pressure which is increased/decreased in accordance with a steering state of a main oil pressure path from a main pump P in a main pump hydraulic system 2.

This control will be briefly described below. That is, the above relief valve 40 comprises a ball 40a for constantly closing a path 41a connected to an annular groove 35b and a path groove 36b at sleeve 31 side constituting a variable throttle portion 37 and a coil spring 40b for biasing the ball 40a at a predetermined set pressure, and is connected to a tank T side via a path 41b. The coil spring 40b constituting the relief valve 40 is held by a large-diameter flange 44a of a plunger 44 which is slidably supported by a shaft hole 43a formed in a plug 43 for closing an opening end of a hole portion 42 formed in the spool 32 incorporating the relief valve 40. Note that the plug 43 also has a function of adjusting the set pressure of the spring 40b. In addition, operation characteristics of the relief valve 40 can be adjusted to be a predetermined state by changing the diameter of the shaft hole 43a of the plug 43 for holding the plunger 44, i.e., the pressure-receiving area of the plunger 44.

According to the relief valve 40 having the above arrangement, a relief pressure of a reaction oil pressure can be variably set to be a predetermined state by the plunger 44 in accordance with a PS pressure at the main oil pressure path 4b side of the main pump hydraulic system 3, thereby controlling an oil pressure reaction force more correctly and reliably in accordance with a vehicle speed or a steering state. In this case, according to the structure of this embodiment, a relief pressure change in reaction oil pressure having characteristics as shown in FIG. 12 can be obtained. Note that characteristic curves (a), (b), and (c) can be obtained by arbitrarily setting the coil spring 40b or the pressure-receiving area of the plunger 44.

In the reaction oil pressure control valve 11 having the above relief valve 40, the relief pressure characteristics of the reaction oil pressure are sometimes required to be set to have characteristic curves (d), (e), and (f) which decrease as a PS pressure, i.e., a steering angle is increased. That is, in order to perform a steering operation at a certain predetermined vehicle speed, a steering force is sometimes preferably set to be gradually reduced when a steering resistance is high and a PS pressure in the main oil pressure path 4b of the main pump hydraulic system 2 is high. Such setting is required at a large right-angle curve or upon a rapid steering operation for avoiding danger.

For example, when stationary swing is to be performed or a car is to be parked into a garage, a discharge flow rate from a vehicle-speed responsive sub-pump subP is zero or very small, and a PS output with respect to an input torque is desired to have a characteristic curve as indicated by reference symbol A in FIG. 14. This advantage is apparent from comparison with a characteristic curve in a manual state. Referring to FIG. 14, reference symbol B indicates a characteristic curve obtained in middle-speed driving without using a relief valve; and C, a characteristic curve obtained by using the relief valve 40 having positive characteristics (i.e., a relief pressure is increased as a PS pressure is increased) according to the embodiment shown in FIG. 11. Since a linear input-output characteristic curve similar to the manual characteristic curve is obtained, the characteristic curve C is preferable to a sports car or the like.

In a general vehicle or a high-grade sports car, however, although the characteristic curve B or C is preferable in high-speed driving, a steering wheel becomes too heavy by the linear characteristic as a steering angle of the steering wheel is increased, thereby degrading a comfortable steering feeling. In this case, the relief pressure of the reaction oil pressure is preferably decreased as the pressure in the main oil pressure path 4b is increased in accordance with a steering state. When such a reverse characteristic is used, a characteristic curve as indicated by reference symbol D can be advantageously obtained.

In order to obtain such a relief pressure characteristic, a valve having a structure as shown in, e.g., FIG. 15 is preferably incorporated as the relief valve 40 in a valve hole 50 formed in a body 30 independently of the spool 32. Referring to FIG. 15, reference numeral 51 denotes a plug having a path hole 51a for connecting a chamber 52 of the spring 40b to the tank T, for adjusting a set pressure; 53, a chamber for reducing the set pressure of the spring 40b as the PS pressure is increased; and 44b, a rod portion for urging the ball 40a provided in the plunger 44 in a closing direction. An operation or the like of the rod portion 44b can be easily understood by those skilled in the art.

Note that the present invention is not limited to the structures of the above embodiments but the shape, structure, or the like of each part of the power steering apparatus 1 and the hydraulic reaction device 20 can be arbitrarily modified and changed to form various modifications. For example, in the above embodiments, the power steering apparatus 1 is of a rack-and-pinion type. The present invention, however, can be similarly applied to power steering apparatuses having various structures such as a ball screw type and can achieve the same effects as long as the apparatus has a hydraulic reaction device. Similarly, the structure of the hydraulic reaction device 20 can be variously modified. That is, the vehicle-speed responsive pump subP capable of changing a discharge flow rate in accordance with a vehicle speed is used as a reaction oil pressure supply source to the hydraulic reaction chamber 25, and opening/closing of the path for connecting the hydraulic reaction chamber 25 and the tank T is controlled by a means having a variable throttle function in accordance with a steering state, thereby obtaining steering force characteristics by a steering reaction force corresponding to a vehicle speed or a steering state.

As has been described above, the hydraulic reaction device of the power steering apparatus according the present invention comprises a vehicle-speed responsive pump having a discharge flow rate which changes in accordance with a vehicle speed, and a hydraulic reaction chamber for receiving a pressure oil from the pump to apply a reaction oil pressure on a reaction plunger for selectively constraining relative pivotal displacement between input and output shafts constituting a flow path switching valve at a main pump hydraulic system, and a flow rate of a pressure oil flowing through a path connecting the hydraulic reaction chamber to a tank is variably controlled in accordance with the magnitude of an oil pressure in a main oil pressure path extending from a main pump to left and right chambers of a power cylinder of the power steering apparatus. Therefore, regardless of a simple and inexpensive arrangement, the reaction oil pressure in the hydraulic reaction chamber can be correctly and reliably controlled in accordance with various vehicle driving conditions such as a vehicle speed or a steering state, thereby obtaining a predetermined steering reaction force corresponding to the operation of the main pump hydraulic system of the power steering apparatus. As a result, a steering operation can be correctly performed by a steering force according to a change in vehicle speed or steering state. In particular, since only a variable throttle portion which is operated by an oil pressure in the main oil pressure path need be provided in the path for connecting the hydraulic reaction chamber and the tank, the present invention is practically advantageous.

In addition, according to the present invention, a reaction pressure of the subpump hydraulic system can be controlled to be increased as the oil pressure in the main oil pressure path of the main pump hydraulic system is increased in accordance with an operation of the power steering apparatus upon a steering operation. Therefore, the reaction oil pressure from the vehicle-speed responsive subpump can be returned to the tank to reduce the reaction pressure in a non-steering state in which a steering wheel is not operated. As a result, unlike in a conventional device wherein a predetermined reaction pressure acts in accordance with a vehicle speed but regardless of a steering state, a sliding resistance of a sealing member of, e.g., the hydraulic reaction chamber can be reduced to improve a steering feeling. Also, this arrangement can achieve energy saving since energy consumption of the vehicle-speed responsive subpump is low.

Furthermore, the device of the present invention is not of an electronic-controlled type unlike a conventional device and does not require a control valve for reaction oil pressure control or expensive parts such as an electric actuator for driving the control valve, a controller, and a sensor. Therefore, the arrangement of the device can be simplified to decrease the size of the device as a whole and manufacturing cost. In addition, since the device does not use any part such as a vehicle speed sensor or a controller which is easily influenced by a disturbance such as electromagnetic wave interference, reaction oil pressure control can be performed with high reliability.

What is claimed is:

1. A hydraulic reaction device for a power steering apparatus for supplying a pressure oil to left and right chambers of a power cylinder via a flow path switching valve for switching the pressure oil in a main flow path extending from a main pump in accordance with a steering operation, said hydraulic reaction device selectively constraining relative pivotal displacement between input and output shafts which comprise a rotary flow path of the flow path switching valve, and including an oil pressure reaction mechanism provided between the input and output shafts, a reaction plunger actuated according to the oil pressure reaction mechanism, and a hydraulic reaction chamber, comprising:

a sub flow path independently arranged from said main flow path;

a vehicle-speed responsive pump responsive to vehicle-speed to change a discharge flow rate, and for supplying oil pressure to said sub flow path;

a reaction oil pressure control means having a reaction oil pressure control valve for variably controlling a flow rate via an oil pressure supplied from said vehicle-speed responsive pump and via an oil pressure of said main pump; and said hydraulic reaction chamber for supplying a reaction oil pressure to said reaction plunger being provided between said vehicle-speed responsive pump and said reaction oil pressure control means in said sub flow path, whereby the reaction oil pressure caused by said reaction oil pressure means is controlled in accordance with a magnitude of the oil pressure in said main flow path flowing from said main pump to said left and right chambers of the power cylinder.

2. A hydraulic reaction device for a power steering apparatus for supplying a pressure oil to left and right chambers of a power cylinder via a control valve for switching a flow path from a main pump in accordance with a steering operation, thereby producing a predetermined auxiliary steering force, comprising:

a vehicle-speed responsive pump having a pressure oil discharge flow rate which changes in accordance with a vehicle speed;

a reaction plunger for selectively constraining relative pivotal displacement between input and output shafts constituting a rotary flow path switching valve of said power steering apparatus;

a hydraulic reaction chamber for receiving the pressure oil from said pump to apply a reaction oil pressure to said reaction plunger;

a path arranged to connect said hydraulic reaction chamber to a tank; and variable control means for variably controlling a flow rate of the pressure oil flowing through said path, wherein said variable control means is variably controlled in accordance with a magnitude of an oil pressure in a main oil pressure path extending from the main pump to said left and right chambers of said power cylinder, and wherein said variable control means includes a tapered portion tapered toward one end of a spool which slides in a sleeve by a main pump pressure in said reaction oil pressure control valve and an opening amount between said tapered portion and a hole portion opening end for slidably holding said tapered portion.

3. A device according to claim 2, wherein said spool is formed to have a portion similar to said tapered portion.

4. A device according to claim 2, wherein said tapered portion serving as a throttle portion has a characteristic curve which achieves a predetermined reaction pressure characteristic.

5. A device according to claim 2, wherein said reaction oil pressure control valve has a relief valve for a reaction oil pressure.

6. A device according to claim 2, wherein said spool further includes a stopper projecting from said spool.

* * * * *